US010475442B2

(12) United States Patent
Lee (10) Patent No.: US 10,475,442 B2
(45) Date of Patent: Nov. 12, 2019

(54) METHOD AND DEVICE FOR RECOGNITION AND METHOD AND DEVICE FOR CONSTRUCTING RECOGNITION MODEL

(71) Applicant: Samsung Electronics Co., Ltd., Suwon-si (KR)

(72) Inventor: Ho Shik Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/332,166

(22) Filed: Oct. 24, 2016

(65) Prior Publication Data

US 2017/0148430 A1 May 25, 2017

(30) Foreign Application Priority Data

Nov. 25, 2015 (KR) .................. 10-2015-0165891

(51) Int. Cl.
*G10L 15/00* (2013.01)
*G10L 15/06* (2013.01)
*G10L 15/01* (2013.01)
*G10L 15/16* (2006.01)

(52) U.S. Cl.
CPC ............ *G10L 15/063* (2013.01); *G10L 15/01* (2013.01); *G10L 15/16* (2013.01); *G10L 2015/0635* (2013.01)

(58) Field of Classification Search
CPC ..................................................... G10L 15/00
USPC ...... 704/9, 232, 211, 234, 235, 239; 706/12, 706/16
See application file for complete search history.

(56) References Cited

U.S. PATENT DOCUMENTS

| 819,531 A | 5/1906 | Fisher |
| 6,167,377 A * | 12/2000 | Gillick .................. G10L 15/063 704/240 |
| 6,456,969 B1 * | 9/2002 | Beyerlein ............... G06F 17/17 382/190 |
| 8,301,445 B2 * | 10/2012 | Gruhn ................... G10L 15/187 704/231 |
| 8,775,167 B2 * | 7/2014 | Mysore .................. G10L 15/20 704/211 |
| 8,918,352 B2 | 12/2014 | Deng et al. |
| 8,971,613 B2 | 3/2015 | Miyano |
| 9,240,184 B1 * | 1/2016 | Lin ........................ G10L 15/142 |
| 9,520,127 B2 * | 12/2016 | Li ............................. G10L 15/16 |
| 9,690,776 B2 * | 6/2017 | Sarikaya ........... G06F 16/90332 |
| 9,785,630 B2 * | 10/2017 | Willmore .............. G06F 17/276 |

(Continued)

FOREIGN PATENT DOCUMENTS

| JP | 5321596 B2 | 7/2013 |
| KR | 10-0869554 B1 | 11/2008 |

*Primary Examiner* — Michael C Colucci
(74) *Attorney, Agent, or Firm* — NSIP Law (57) ABSTRACT

A method and a device for recognition, and a method and a device for constructing a recognition model are disclosed. A device for constructing a recognition model includes a training data inputter configured to receive additional training data, a model learner configured to train a first recognition model constructed based on basic training data to learn the additional training data, and a model constructor configured to construct a final recognition model by integrating the first recognition model with a second recognition model generated by the training of the first recognition model.

30 Claims, 7 Drawing Sheets

(56) References Cited

U.S. PATENT DOCUMENTS

| | | | |
|---|---|---|---|
| 9,842,101 B2* | 12/2017 | Wang | G06F 16/3322 |
| 9,846,836 B2* | 12/2017 | Gao | G06N 3/04 |
| 2006/0053014 A1* | 3/2006 | Yoshizawa | G10L 15/06 |
| | | | 704/256.4 |
| 2006/0074657 A1* | 4/2006 | Huang | G10L 15/07 |
| | | | 704/246 |
| 2007/0136062 A1* | 6/2007 | Braunschweiler | G10L 13/10 |
| | | | 704/253 |
| 2007/0150424 A1 | 6/2007 | Igelnik | |
| 2009/0271195 A1* | 10/2009 | Kitade | G10L 15/065 |
| | | | 704/239 |
| 2009/0327176 A1 | 12/2009 | Teramoto | |
| 2010/0191530 A1* | 7/2010 | Nakano | G10L 15/005 |
| | | | 704/244 |
| 2011/0060587 A1* | 3/2011 | Phillips | G10L 15/30 |
| | | | 704/235 |
| 2011/0202487 A1 | 8/2011 | Koshinaka | |
| 2013/0018825 A1* | 1/2013 | Ghani | G06N 20/00 |
| | | | 706/12 |
| 2014/0180974 A1 | 6/2014 | Kennel et al. | |
| 2014/0205978 A1 | 7/2014 | Tormos Munoz et al. | |
| 2014/0257803 A1* | 9/2014 | Yu | G06N 3/0481 |
| | | | 704/232 |
| 2014/0309754 A1 | 10/2014 | Markert et al. | |
| 2014/0337257 A1 | 11/2014 | Chatterjee et al. | |
| 2015/0019214 A1* | 1/2015 | Wang | G10L 15/34 |
| | | | 704/232 |
| 2015/0127594 A1* | 5/2015 | Parada San Martin | |
| | | | G06N 3/0454 |
| | | | 706/16 |

\* cited by examiner

METHOD AND DEVICE FOR RECOGNITION AND METHOD AND DEVICE FOR CONSTRUCTING RECOGNITION MODEL

CROSS-REFERENCE TO RELATED APPLICATION(S)

This application claims the benefit under 35 USC 119(a) of Korean Patent Application No. 10-2015-0165891 filed on Nov. 25, 2015, in the Korean Intellectual Property Office, the entire disclosure of which is incorporated herein by reference for all purposes.

BACKGROUND

1. Field

The following description relates to a device and a method of constructing a recognition model and a device and a method of recognition.

2. Description of Related Art

Due to the widespread use of information devices such as personal computer, smartphones, and the like, digital signal processing technologies and digital computer applications are rapidly advancing. Among these technologies, neural network based information processing is capable of parallel processing distributed information via a network mechanism. By applying parallel processing, large number of simple information processing elements may be combined by the exchanging simple signals through a network. As an information processing based on the network mechanism, studies on neural network information processing that simulates a human brain structure on a computer are being actively carried out in various fields.

Generally, in order for a model that has learned large amount data to learn additional data, a method has been used for which the model is trained with the large data that is the sum of the prior existing training data and the additional training data. However, in this method, an amount of data for training increases, and an excessive amount of time may be consumed for training in the event that the existing training data is large.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In one general aspect, a device for constructing a recognition model includes a training data inputter configured to receive additional training data, a model learner configured to train a first recognition model constructed based on basic training data to learn the additional training data, and a model constructor configured to construct a final recognition model by integrating the first recognition model with a second recognition model generated by the training of the first recognition model.

The basic training data and the additional training data may include at least one of voice data, sound data, image data, text data, and bio-signal data.

The first recognition model may be based on a neural network.

The model learner may be configured to use either an error back-propagation algorithm or a gradient descent algorithm in training the first recognition model with the additional training data.

The general aspect of the device may further include a model storage configured to store one or more first recognition models constructed based on one or more sets of basic training data in advance, wherein, in response to the additional training data being received, the model learner may be configured to acquire a first recognition model related to the received additional training data from the model storage.

The model constructor may be configured to obtain a linear sum of the first recognition model and the second recognition model.

The model constructor may be configured to select one or more weights from a preset weight candidate group, generate one or more recognition models for each weight by assigning the selected weights and performing linear summations, and determine at least one of the generated one or more recognition models as a final recognition model.

The weights may be preset based on at least one of a comparison between quantity of the basic training data and quantity of the additional training data, a purpose of additional learning, and importance of additional learning.

The general aspect of the device may further include a model evaluator configured to evaluate a constructed final recognition model using evaluation data in response to the final recognition model being constructed.

In response to an evaluation that the final recognition model does not satisfy a predetermined standard, the model learner may be configured to train the final recognition model to re-learn the additional training data.

In another general aspect, a method of constructing a recognition model involves receiving additional training data, training a first recognition model based on basic training data to learn the additional training data, and constructing a final recognition model by integrating the first recognition model with a second recognition model generated based on the training of the first recognition model.

The first recognition model may be based on a neural network.

The training of the first recognition model may involve acquiring a first recognition model related to the received additional training data from a model storage in response to receiving the additional training data.

The constructing of the final recognition model may involve obtaining a linear sum of the first recognition model and the second recognition model.

The constructing of the final recognition model may involve selecting one or more weights from a preset weight candidate group, generating one or more recognition models for each weight by assigning the selected weights and performing linear summations, and determining at least one of the generated one or more recognition models as a final recognition model.

The general aspect of the method may further involve evaluating a constructed final recognition model using evaluation data in response to the final recognition model being constructed.

The general aspect of the method may further involve, in response to an evaluation that the final recognition model does not satisfy a predetermined standard, training the final recognition model to re-learn the additional training data.

In another general aspect, a non-transitory computer-readable storage medium stores instructions that, when executed by a processor, cause the processor to perform the general aspect of the method described above.

In yet another general aspect, a recognition device includes a processor configured to receive data to be recognized from a user; determine whether to update a recognition model constructed in advance based on the received data; in response to a determination that an update is required, train the recognition model to learn additional training data to update the recognition model, and recognize the received data using the recognition model constructed in advance or the updated recognition model.

The processor may include a recognition data inputter configured to receive the data, a model update determiner configured to determine whether to update the recognition model constructed in advance, a model updater configured to train and update the recognition model, and a data recognizer configured to recognize the received data.

The model update determiner may be configured to determine whether to update the recognition model constructed in advance based on either relevance between basic training data used to construct the recognition model constructed in advance and the received data or accuracy of a recognition result obtained using the recognition model constructed in advance.

The general aspect of the recognition device may further include an additional data inputter configured to receive additional training data related to the received data in response to a determination that an update is required.

The model updater may be configured to perform a weighted linear summation of the recognition model constructed in advance and a recognition model generated as a result of learning of the recognition model constructed in advance and update the recognition model constructed in advance based on the result of the weighted linear summation.

The general aspect of the recognition device may further include a recognition result provider configured to process a recognition result based on the purpose of the data recognition and provide the processed recognition result to the user.

In yet another general aspect, a recognition model construction device includes a processor configured to train a first recognition model with additional training data to obtain a second recognition model, and construct a third recognition model by integrating the first recognition model with the second recognition model based on a weight.

The first recognition model may be a model constructed based on basic training data, and the additional training data may include data not included in the basic training data.

The processor may be configured to construct the third recognition model by using the weight to obtain a linear sum of the first recognition model and the second recognition model.

The processor may be further configured to select a model among a plurality of recognition models stored in a memory as the first recognition model based on a relevance of the selected model to the additional training data.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Hereinafter, examples of devices and methods of constructing a recognition model and a recognition device will be described in detail with reference to the drawings.

Figure 1:
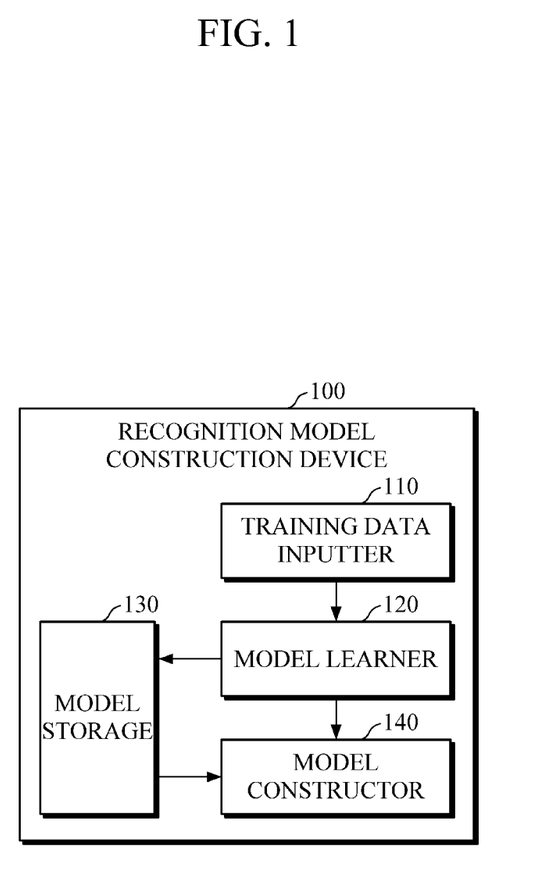
FIG. 1 is a block diagram of an example of a recognition model construction device.

FIG. 1 is a block diagram of an example of a recognition model construction device 100. According to one example, the recognition model construction device 100 may be implemented with a software running on a processor or manufactured in the form of a hardware chip to be embedded in various types of electronic apparatuses. In this example, the electronic apparatuses may be various types of information processing apparatuses such as a desktop computer, a server, a laptop, a smartphone, and a smart pad, but are not limited thereto. Further, the recognition model construction device 100 may be implemented as an element of the recognition device or as a separate module that is embedded in an electronic apparatus together with the recognition device. Alternatively, the recognition model construction device 100 may be embedded in an electronic apparatus separate from the recognition device, and may perform wired or wireless communications with the recognition device and provide information on a constructed model to the recognition device. However, the configuration of the recognition model construction device 100 is not limited thereto.

Meanwhile, types of data that may be recognized by the recognition model construction device 100 include voice data, sound data, image data, text data, and bio-signal data acquired from a healthcare device; however, the types of data are not particularly limited thereto and may include all other data that may be classified using a recognition model. However, voice or image data will be described as an example below for convenience.

Referring to FIG. 1, the recognition model construction device 100 includes a training data inputter 110, a model learner 10, a model storage 130, and a model constructor 140.

The training data inputter 110 receives additional training data required to be learned.

In this example, the additional training data refers to data that is to be recognized. The additional training data may include voice data, sound data, image data, text data, bio-signal data, and the like.

According to one example, as the additional training data, the training data inputter 110 receives voice/image data from a user via an electronic component or device, such as a microphone, camera and the like, that is embedded in an electronic apparatus. The electronic apparatus may further include the recognition model construction device 100, or the recognition model construction device 100 may be directly/indirectly connected to the electronic apparatus. However, the configuration of the recognition model construction device 100 is not limited thereto. According to another example, the training data inputter 110 receives voice/image data collected by an external automation device such as a closed-circuit television (CCTV) or a black box as the additional training data.

For example, a first recognition model may have been constructed in advance to recognize a voice included in voice data. In this example, the additional training data input to the training data inputter 110 may be voice data that were not included in basic data that was used to construct the first recognition model in the first place. For example, the first recognition model may have been constructed based on standard voice data without any accent as the basic training data. For example, to construct a first recognition model for recognizing words in Korean speech, the basic training data may include Korean standard pronunciations without any accent. In this example, local dialects, slangs, newly-coined words, foreign languages and the like that were not included in the basic training data used to construe the first recognition model. Data that reflect local dialects, slangs, newly-coined words, foreign languages and the like may be provided to the training data inputter 110 as the additional training data.

According to another example, the first recognition model may have been constructed in advance to recognize an object included in image data; in this example, the additional training data input to the training data inputter 110 may be an object not included in the basic data that was used as the basis in constructing the first recognition model. For example, the first recognition model may have been constructed based on each image data set including known animal objects, such as dogs, cats, and lions, as the basic training data. It may be desirable to further expand the first recognition model when new animals are discovered or to add imaginary animal characters or the like. Thus, image data related to the new animals or the imaginary animal characters may be provided to the training data inputter 110 as the additional training data. In this example, the image data may be a dynamic image or a static image.

Meanwhile, the size of additional training data may be preset based on the purpose of additional learning, an application field of a recognition model, a computing performance of a device, and the like. For example, in the event that a recognition model is utilized in a field in which the accuracy of recognition is more important than speed, the size of additional training data required in additional learning may be set to be relatively large.

The first recognition model may be a model based on a neural network. For example, the first recognition model may be based on a deep neural network (DNN), a recurrent neural network (RNN), or a bidirectional recurrent deep neural network (BRDNN), but is not limited thereto.

When additional training data are input, the model learner 120 may allow the first recognition model constructed in advance based on basic training data to learn the additional training data.

Upon receiving the additional training data, the model learner 120 may analyze the type and other features of the input additional training data and may acquire the first recognition model related to the additional training data from the model storage 130 based on the result of analysis. When a plurality of the first recognition models were already constructed in advance, the model learner 120 may determine a first recognition model that is highly relevant to the additional training data and the basic training data as a model for performing additional learning.

The model storage 130 may store an existing first recognition model that has learned the basic training data therein. The basic training data may be classified according to types of data including voice, image, and the like. The first recognition model may have been constructed by learning each type of data in advance. In addition, the basic training data may be further subdivided for each type of data, and the first recognition model may be constructed in advance for each type of data and for each subdivided group. For example, the type of data may be voice data. The basic training data may be subdivided according to the language spoken by the voice, a geographic region, gender, age, and the like of a user who has produced the voice. In addition, when the type of data is an image, the basic training data may be subdivided by types of objects in the image. For example, the basic training data may be subdivided based on various classification standards such as, for example, an animal, a plant, a human, and the like.

The model learner 120 may train the first recognition model to learn using at least one of learning algorithms including an error back-propagation algorithm and a gradient descent algorithm. In one example, the DNN may learn to distinguish based on a standard error back-propagation algorithm. Here, weights may be updated by a stochastic gradient descent algorithm.

The model constructor 140 may construct a final recognition model by integrating a second recognition model generated through the additional training with the first recognition model. That is, the final recognition model may be constructed by integrating the first recognition model with the second recognition model that has learned the additional training data.

For example, the model constructor 140 may construct the final recognition model by linearly summing the first recognition model and the second recognition model. In this example, the model constructor 140 uses a linear function based on an L2 norm penalty method as shown in Equation 1 below, assign a weight of $(1-\lambda)$ to a first recognition model $\omega_0$ using a preset parameter $\lambda$, and assign a weight of $\lambda$ to a second model $\omega_n$ to perform the linear summation.

$$\omega_{n+1} = (1-\lambda)\omega_0 + \lambda\tilde{\omega}_{n+1}$$
$$= (1-\lambda)\omega_0 + \lambda(\omega_n - \nabla f(\omega_n))$$

[Equation 1]

In Equation 1, $\omega_{n+1}$ represents a final recognition model, $\omega_n$ represents a second recognition model that has learned additional training data, and ω₀ represents an existing recognition model constructed in advance to be integrated with the second recognition model and, in this example, represents the first recognition model constructed in advance based on basic training data.

Meanwhile, a weight, i.e. the parameter λ may be freely selected based on a difference between quantity of basic training data sets and quantity of additional training data sets, the purpose of learning, an application field of a recognition model, and importance of learning, and the like. According to one example, the weight may be preset to a suitable value by repetitively performing preprocessing processes.

For example, when the quantity of basic training data set is substantially larger than the quantity of additional training data, the weight may be set such that a proportion of the first recognition model is larger than the second recognition model.

In another example, basic training data may relate only to expressions used while traveling such as, for example, those related to travel, ordering a meal, and using public transportation, while additional training data includes everyday expressions. In such an example, the weight may be set in consideration of the purpose of learning and the importance of learning, which is greater than the importance of maintaining integrity of the first recognition model. Thus, a proportion of the second recognition model that is construed by learning only the additional training data is larger when the linear summation is performed.

In still another example, in response to the purpose of learning being related to constructing a personalized recognition model of a particular user, a weight of a second recognition model that has learned using additional training data input by the user, e.g. voice data produced by unique pronunciations of the user, may be set to be relatively large. For example, when voice recognition is performed in English, because non-English-speaking users tend to have difficulty in accurately pronouncing English alphabets "R" and "L" and "F" and "P", the users may construct a final recognition model through additional training data related to English vocabularies, phrases, sentences, and the like with which they struggle. In this example, by assigning a relatively larger weight to a second recognition model that has learned using the additional training data, a final recognition model further optimized to the users may be constructed.

Meanwhile, although the parameter λ may be preset as one value, a weight candidate group that includes two or more multiple values (e.g. $\lambda_1, \lambda_2, \ldots, \lambda_n$) may also be preset. In this example, the model constructor 140 may select one or more parameters from the weight candidate group or the whole weight candidate group. By applying Equation 1 to each of the selected parameters (e.g. $\lambda_1, \lambda_2, \ldots, \lambda_n$) and performing a linear summation, a plurality of integrated results may be generated, and the plurality of integrated results generated may be constructed as final recognition models. In this example, at least one of the plurality of final recognition models may be determined as a final recognition model. Meanwhile, the number of parameters selected from the weight candidate group may be determined according to requested degree of accuracy of a model, a model construction time, and the like. For example, a large number of parameters may be used to improve the accuracy of a final recognition model, or a smaller number of parameters may be used to shorten the model construction time.

According to a disclosed example, a process of training a recognition model to learn an entire set of training data that includes basic training data and additional training data to construct a final recognition model is not consumed in constructing a recognition model reflecting additional training data; accordingly, an increase in computation or additional resources such as memory is generally not required to train a recognition model with additional training data. Thus, a speed of additional learning for the model may be increased. In addition, because basic training data is not used when a recognition model learns additional training data and the additional training data is reflected to the first recognition model constructed in advance based on the basic training data, a performance of the first recognition model constructed in advance may be maintained as much as possible.

Figure 2:
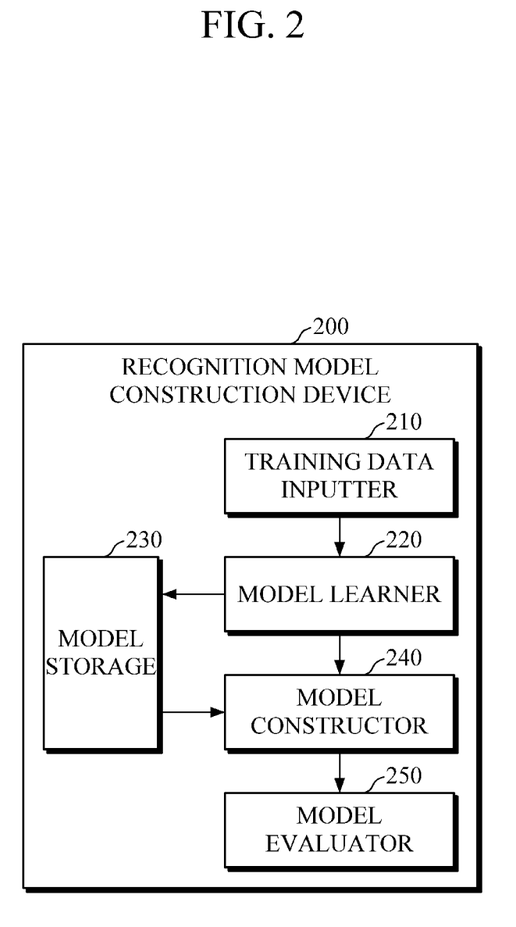
FIG. 2 is a block diagram of another example of a recognition model construction device.

FIG. 2 is a block diagram of another example of a recognition model construction device 200.

Referring to FIG. 2, the recognition model construction device 200 includes a training data inputter 210, a model learner 220, a model storage 230, a model constructor 240, and a model evaluator 250.

Since the training data inputter 210, the model learner 220, the model storage 230, and the model constructor 240 have been described in detail with reference to FIG. 1, detailed descriptions thereof will be omitted.

The training data inputter 210 receives additional training data that are to be learned by a recognition model as described above.

According to one example, in response to receiving additional training data, the model learner 220 may determine a first recognition model that is to learn the additional training data and learn the additional training data using the determined first recognition model.

In another example, in response to receiving the additional training data are, the model learner 220 may analyze a type and other features of the input additional training data and acquire the first recognition model related to the additional training data from the model storage 230 based on the result of analysis.

When the learning of the additional training data by the first recognition model is completed by the model learner 220, the model constructor 240 may use a second recognition model generated by the additional learning using the first recognition model and the additional training data to construct a final recognition model. For example, the model constructor 240 may use the linear function in Equation 1 as described above to integrate the first recognition model with the second recognition model by a linear summation. In this process, preset weights may be assigned to the first recognition model and the second recognition model to adjust proportions of the first recognition model and the second recognition model integrated with the final recognition model.

When the final recognition model is constructed, the model evaluator 250 may evaluate the constructed final recognition model using evaluation data. The model evaluator 250 may input a plurality of evaluation data to the final recognition model and make the model learner 220 to re-learn in the event that a recognition result output from the final recognition model does not satisfy a predetermined standard.

For example, in response to a determination that the number or proportion of evaluation data with an inaccurate recognition result exceeds a preset threshold value among the recognition result of the final recognition model with respect to the plurality of evaluation data, the model evaluator 250 may evaluate that the recognition result does not satisfy the predetermined standard. For example, when the predetermined standard is a proportion of 20%, the model evaluator 250 evaluates a constructed final recognition model that outputs an incorrect recognition result with respect to more than twenty evaluation data among thousand evaluation data as failing to satisfy the predetermined standard.

In response to a determination that the final recognition model does not satisfy a predetermined standard as a result of evaluation by the model evaluator 250, the model learner 220 may re-learn the additional training data. In this process, the model learner 220 may use the final recognition model constructed by the model constructor 240 as the existing recognition model $\omega_0$ in Equation 1 and may re-learn the additional training data input by the training data inputter 210.

Meanwhile, as described with reference to FIG. 1, in the event that a weight candidate group that includes a plurality of parameters is preset, the model constructor 240 may select one or more parameters from the weight candidate group and generate a final recognition model with respect to each of the selected parameters. The model evaluator 250 may evaluate whether each of the final recognition models satisfies a predetermined standard and may determine a model that satisfies the predetermined standard as a final recognition model. In this example, in response to two or more models satisfying the predetermined standard, all of the models that satisfy the predetermined standard may be determined as final recognition models, or a preset one or a predefined number of models sorted in order of having highest to lowest evaluation scores may be determined as final recognition models among the models that satisfy the predetermined standard. However, embodiments are not limited thereto.

Figure 3:
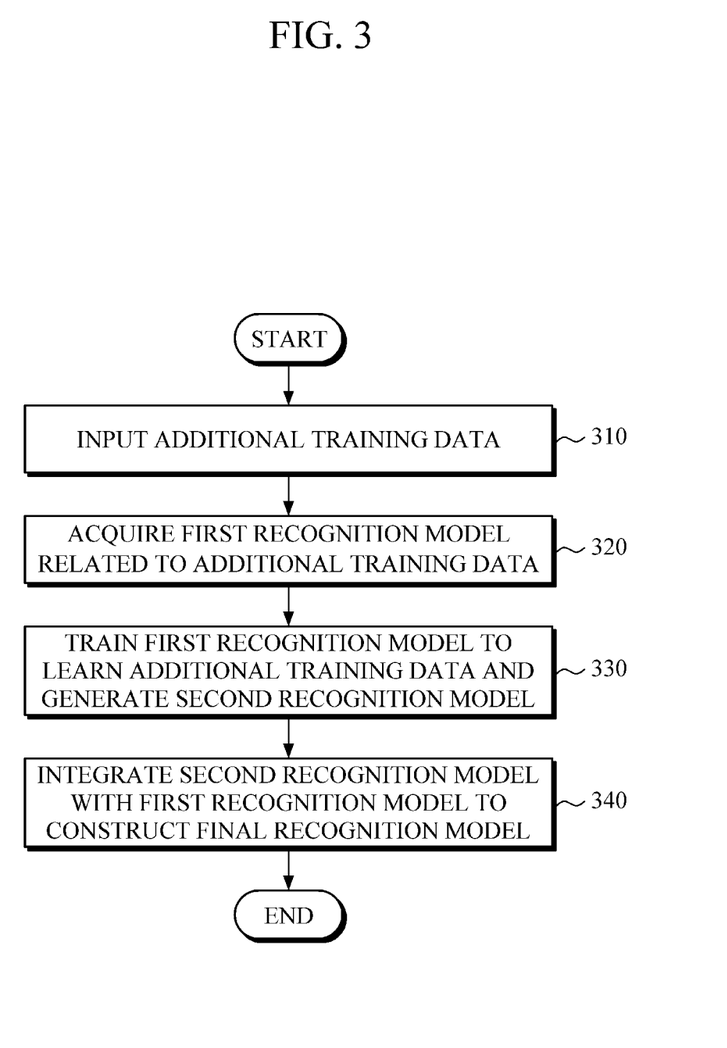
FIG. 3 is a flowchart of an example of a recognition model construction method.

FIG. 3 illustrates a flowchart of an example of a recognition model construction method.

The recognition model construction method of FIG. 3 may be performed by an example of a recognition model construction device 100 illustrated in FIG. 1.

First, in 310, the recognition model construction device 100 receives additional training data. The recognition model construction device 100 may receive voice/image data as additional training data from a user or may receive voice/image data collected by an external automation device such as a CCTV or a black box as additional training data.

In response to receiving the additional training data input, the recognition model construction device 100 may analyze a type and other features of the additional training data and acquire the first recognition model related to the additional training data from the model storage 130 based on the result of analysis, in 320. In the event that a plurality of first recognition models were constructed in advance, the model learner 120 may determine a first recognition model with high relevance between the additional training data and the basic training data as a model on which the additional learning is to be performed. In this example, the first recognition model may be a model based on a neural network. For example, the first recognition model may be based on a DNN, an RNN, and a BRDNN, but the configuration of the first recognition model is not limited thereto.

Next, in 330, in response to the additional training data being input, the recognition model construction device 100 trains the first recognition model to learn the additional training data and generate a second recognition model. According to one example, the recognition model construction device 100 trains the first recognition model to learn the additional training data using at least one learning algorithm among an error back-propagation algorithm and a gradient descent algorithm. For example, the DNN may learn to be distinguished with a standard error back-propagation algorithm. The weights may be updated by a stochastic gradient descent algorithm.

Next, in 340, the recognition model construction device 100 may integrate the second recognition model generated according to the learning with the first recognition model to construct a final recognition model.

For example, in 340, the recognition model construction device 100 may construct the final recognition model by performing a linear summation of the first recognition model and the second recognition model using a linear function. In this example, the linear function may be a linear function based on an L2 norm penalty method as in Equation 1 mentioned above but is not limited thereto. A weight, i.e. the parameter $\lambda$, to be assigned to each recognition model in the linear function as in Equation 1 may be preset as a proper value through a preprocessing process. According to one example, a weight candidate group that includes a plurality of parameters $\lambda$ may be set, and a plurality of recognition models may be constructed as described above.

Figure 4:
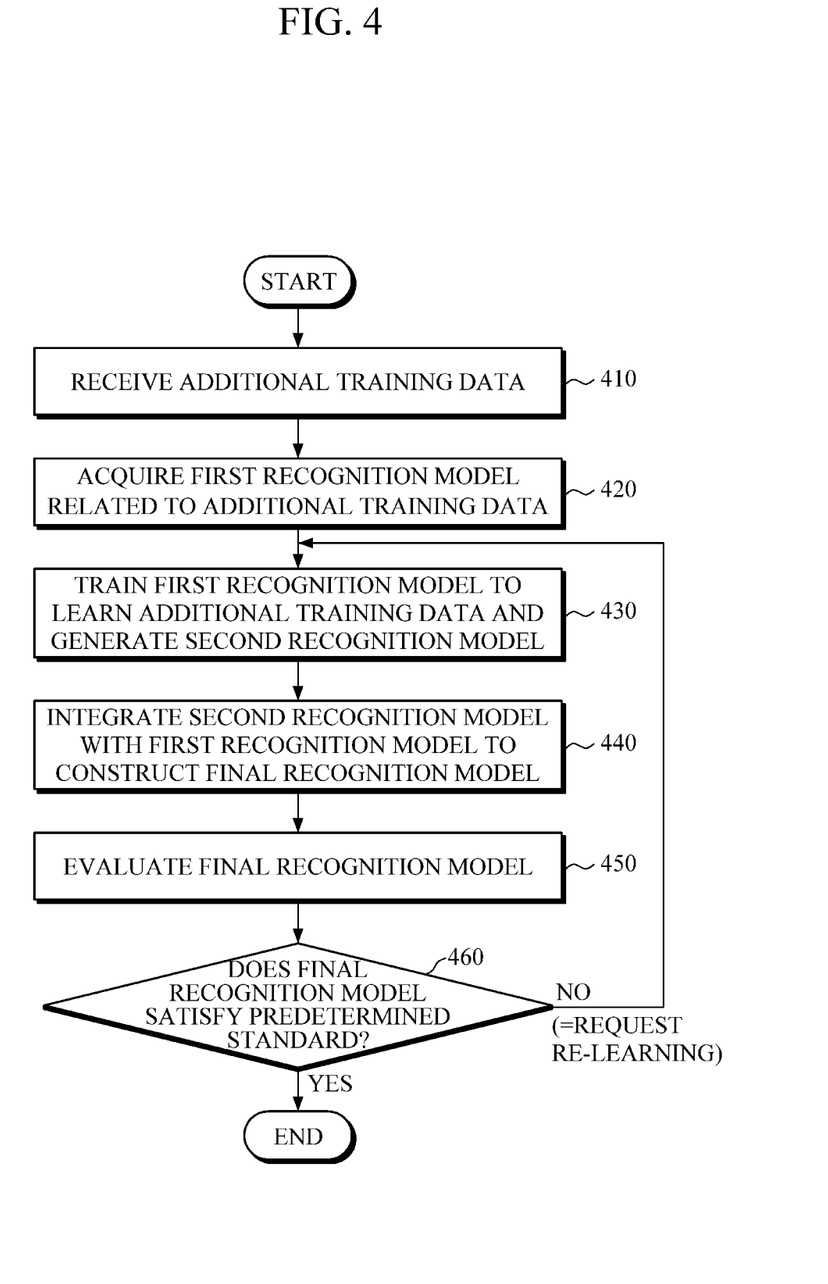
FIG. 4 is a flowchart of another example of a recognition model construction method.

FIG. 4 illustrates a flowchart of another example of a recognition model construction method. The recognition model construction method illustrated in FIG. 4 may be performed by an example of a recognition model construction device 200 illustrated in FIG. 2.

First, in 410, the recognition model construction device 100 receives additional training data.

Next, in response to the additional training data being input, in 420, the recognition model construction device 200 analyzes the input additional training data and acquires the first recognition model to perform learning from the model storage based on the result of analysis. In this example, the model storage stores existing recognition models that have learned basic training data classified in various ways, and an existing recognition model that is highly relevant to the input additional training data may be determined as the first recognition model. In the event that the type of the input additional training data is voice, the recognition model construction device 200 may acquire a voice recognition model from the model storage. When the voice is in English, the recognition model construction device 200 may acquire a voice recognition model that has learned basic training data configured with a voice in English. However, embodiments are not limited thereto, and as described in detail above regarding the model storage with reference to FIG. 2, the recognition model construction device 200 may analyze the additional training data corresponding to various classification standards of existing recognition models.

Then, in 430, the recognition model construction device trains the acquired first recognition model to learn the additional training data and generates a second recognition model.

Then, in 440, the recognition model construction device 200 integrates the second recognition model with the first recognition model to construct a final recognition model. In this example, the linear function as in Equation 1 may be used, and a proper weight may be assigned to each recognition model according to a preset standard.

Then, in response to the final recognition model being constructed, in 450, the recognition model construction device 200 evaluates the constructed recognition model using evaluation data.

Then, in 460, the recognition model construction device 200 determines whether the final recognition model satisfies a predetermined standard. For example, in response to a determination that the number or proportion of inaccurate results output exceeds a preset threshold value among the recognition results obtained by the final recognition model with respect to the plurality of evaluation data, the model evaluator 250 may evaluate that the recognition result does not satisfy the predetermined standard. In response to the predetermined standard being not satisfied in 460, the process may proceed back to 430 in which the recognition model is again trained to learn the additional training data.

In this example, in the event that a plurality of recognition models are constructed using one or more parameters λ from the weight candidate group that includes the plurality of parameters λ preset in 440, the recognition model construction device 200 may determine some of the recognition models constructed based on the evaluation result as the final recognition models. In this example, in the event that there is no recognition model that satisfies a predetermined standard, the process may proceed back to 430 in which re-learning is performed.

The recognition model construction device 200 trains the final recognition model constructed in a preceding step 440 instead of the first recognition model constructed in advance to learn the additional training data and generate the second recognition model in 430. The process above may be repeated until the final recognition model satisfies the predetermined standard.

Figure 5:
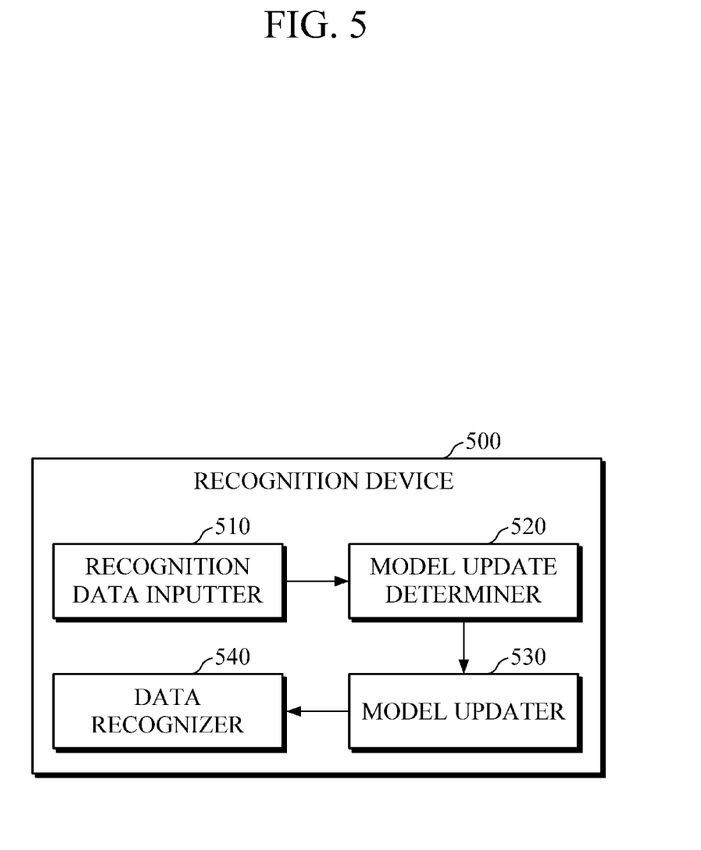
FIG. 5 is a block diagram of an example of a recognition device.

FIG. 5 illustrates a diagram of an example of a recognition device 500. In this example, the recognition device 500 may be implemented with a software that runs on a processor or manufactured in the form of a hardware chip that is to be embedded in various types of electronic devices. In addition, the recognition model construction devices according to the examples described above may be embedded in the recognition device 500. However, the configuration of the recognition device 500 is not limited thereto Referring to FIG. 5, the recognition device 500 includes a recognition data inputter 510, a model update determiner 520, a model updater 530, and a data recognizer 540.

The recognition data inputter 510 may receive data to be recognized from a user. For example, the user may input voice data or image data in various circumstances such as during interpretation, translation, application execution, controlling an electronic device, and inputting a message in a message application, and the like, via an electronic device such as a smartphone that he or she possesses. In this example, the recognition data inputter 510 of the recognition device 500 embedded in the electronic device possessed by the user or embedded in another device connected to the electronic device may receive the voice data or the image data input by the user as recognition data to be recognized.

When a user inputs data to be recognized, the model update determiner 520 determines whether to use an embedded recognition model as is or whether the recognition model needs an update.

For example, the model update determiner 520 may analyze relevance and other shared features between basic training data that were used constructing the recognition model in advance and the data to be recognized provided from the user to determine whether the recognition model is to be updated. In this example, the relevance may be determined based on various standards including user's location, residence area, language used, pronunciation characteristic (e.g. a local dialect), age, gender, and the like. For example, the model update determiner 520 may determine that the update is required in response to a determination that the relevance between the basic training data and the data to be recognized is low, as described below.

For example, when a recognition model is constructed based on voice data of standard pronunciations of a language as basic training data, such as Korean standard pronunciation without local accents, and when data to be recognized is input in a foreign language such as French, the model update determiner 520 may determine that the relevance between the data to be recognized and the basic training data is low and determine that an update of the recognition model is required. Alternatively, when a user providing the input speech uses a particular local dialect, the model update determiner 520 may determine that the relevance toward the basic training data of standard pronunciations is low and determine that an update of the recognition model is required. In this example, although not illustrated, the recognition device 500 may further include an information management unit that manages the language used by the user, residence area, pronunciation features of the user, gender, age, and the like.

Alternatively, in response to the data to be recognized being input from the user, the model update determiner 520 may determine a current location (e.g. inside an airport) of the user by using a global navigation satellite system (GNSS), a caller identification system, a LAN connection position detection method, and the like and may determine the relevance to be low when the basic training data does not reflect a circumstance corresponding to the user's current location (e.g. being situated in an airport) and determine that an update of the recognition model is required.

The examples are provided to facilitate understanding the present disclosure, and the present disclosure is not limited thereto and may be expanded to cover various circumstances.

In another example, the model update determiner 520 may determine whether to update a recognition model based on the accuracy of recognition by the currently embedded recognition model. In this example, the model update determiner 520 determines the accuracy of recognition based on recognition results obtained using the recognition model for a predetermined time period prior to the present, and when the determined accuracy of recognition does not satisfy a predetermined standard (e.g. 80% average), the model update determiner 520 determines that an update of the recognition model is required. In this example, the predetermined standard may be preset based on an application field and/or other features in which the recognition model is mostly likely to be used.

In still another example, the model update determiner 520 determines whether to update a current recognition model based on a response of the user with respect to a recognition result of the data recognizer 540. For example, in response to the data recognizer 540 outputting recognition data input from the user as a recognition result using the recognition model, the model update determiner 520 may present a question and answer opportunity to the user with an inquiry about whether the recognition result is accurate and determine whether to update the recognition model based on the response of the user to the inquiry.

The model updater 530 updates the recognition model using various preset methods in response to a determination by the model update determiner 520 that an update of the currently embedded recognition model is required. For example, the model updater 530 may perform a linear summation of a new recognition model generated as a result of training an existing recognition model and the existing recognition model that was constructed in advance, and may update the existing recognition model based on the result of the linear summation. In this example, the linear function may be a linear function based on the L2 norm penalty method as in Equation 1 described above, but is not limited thereto. In the linear function as in Equation 1, the weight, i.e. the parameter λ, to be assigned to each recognition model may be preset as a proper value through a preprocessing process.

For example, in response to the recognition device 500 being connected to the recognition model construction device via a wired or wireless network, the model updater 530 may transmit information on the user's current position, current situation, and the like to the recognition model construction device, may receive a recognition model that has learned additional training data from the recognition model construction device based on the information on the user, and may update the current recognition model.

Alternatively, as will be described in detail with reference to FIG. 6, the model updater may receive additional training data corresponding to a current situation from the user and use the input additional training data to update the current recognition model, or use the data to be recognized as the additional training data to update the current recognition model.

The data recognizer 540 may recognize input data to be recognized using the currently embedded recognition model and output the result of the recognition.

Figure 6:
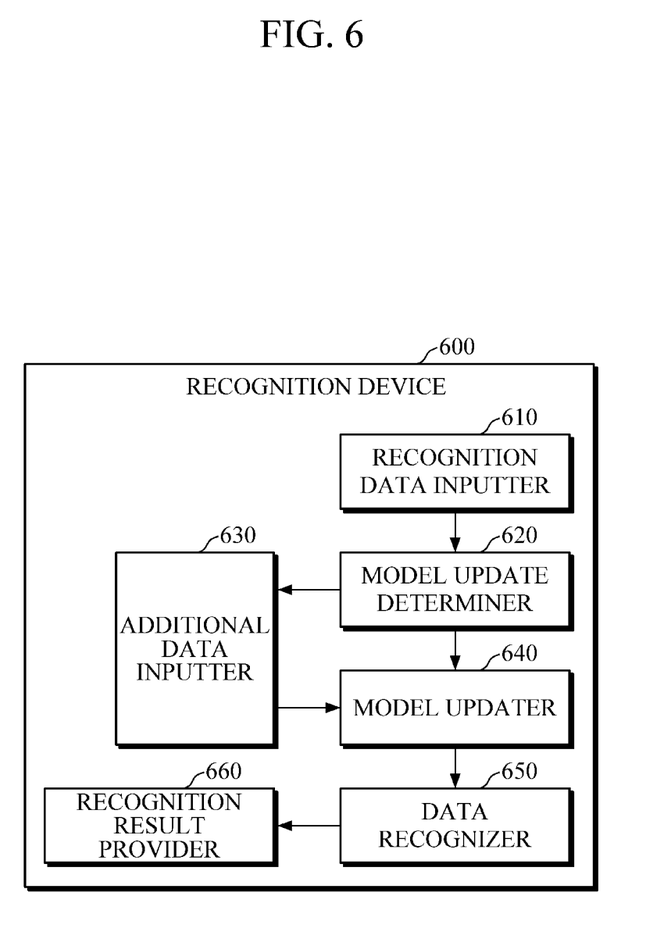
FIG. 6 is a block diagram of another example of a recognition device.

FIG. 6 illustrates another example of a recognition device 600.

Referring to FIG. 6, the recognition device 600 includes a recognition data inputter 610, a model update determiner 620, an additional data inputter 630, a model updater 640, a data recognizer 650, and a recognition result provider 660.

The recognition data inputter 610 receives data to be recognized from a user.

When the data to be recognized is input from the user, the model update determiner 620 determines whether to use the embedded recognition model as is or an update of the recognition model is required.

In response to a determination that the update is required, the additional data inputter 630 may receive from the user additional training data corresponding to the current situation. For example, the recognition device 600 may update a voice recognition model constructed based on standard pronunciations to recognize pronunciations of local dialects. In this example, the additional data inputter 630 may receive voice data including various words or predicates pronounced with local dialects as the additional training data. In another example, the recognition device 600 may update an image recognition model to recognize a new animal. In this example, the additional data inputter 630 may receive a plurality of image data with various postures, motions, capture angles, or captured backgrounds related to the new animal to be recognized as the additional training data.

When the model update determiner 620 determines that an update of a currently embedded recognition model is required, the model updater 640 updates the recognition model using various preset methods. Additional training data required for the model updater 640 to update the model may be acquired from the additional data inputter 630, or data to be recognized from the recognition data inputter 610 may be acquired as the additional training data.

The data recognizer 650 may recognize the input data to be recognized using the currently embedded recognition model and output the recognition result.

The recognition result provider 660 may process the recognition result based on the purpose of data recognition and may provide the recognition result to the user.

According to an aspect, the recognition result provider 660 may provide a text, voice, a video, or a static image related to the recognition result. For example, when auditory data that includes sounds such as a human voice, howling of animals, and birdsongs are input to the recognition data inputter 610, the recognition result provider 660 may process the recognition result and describe the content of each of the sounds included in the auditory data or provide a text, an image or a pre-stored voice related to the type of the object making a sound, e.g. an animal corresponding to a recognized howling and a bird corresponding to a birdsong. In another example, when image data is input to the recognition data inputter 610, the recognition result provider 660 may describe an object in the image, provide a dynamic or static image related to the object in the image, or provide a voice related to the object to the user.

According to another aspect, the recognition result provider 660 may execute an application of the recognition device 600 based on the recognition result or execute an operation in the application based on the recognition result in the application being executed. As an example of the application related to the recognition result, the recognition result provider 660 may execute an application of the recognition device 600 that incorporates a word, a sentence, or the like included in the recognition result into the name of an application. As an example of executing an operation in the application based on a recognition result, the recognition result provider 660 may execute an operation of the application such as the application of the recognition device 600 executing or ending when the user utters a command such as "start," "end" or the like, or such as executing an operation of displaying spoken words in text within the application as if the words spoken by the user were input with a keyboard.

Figure 7:
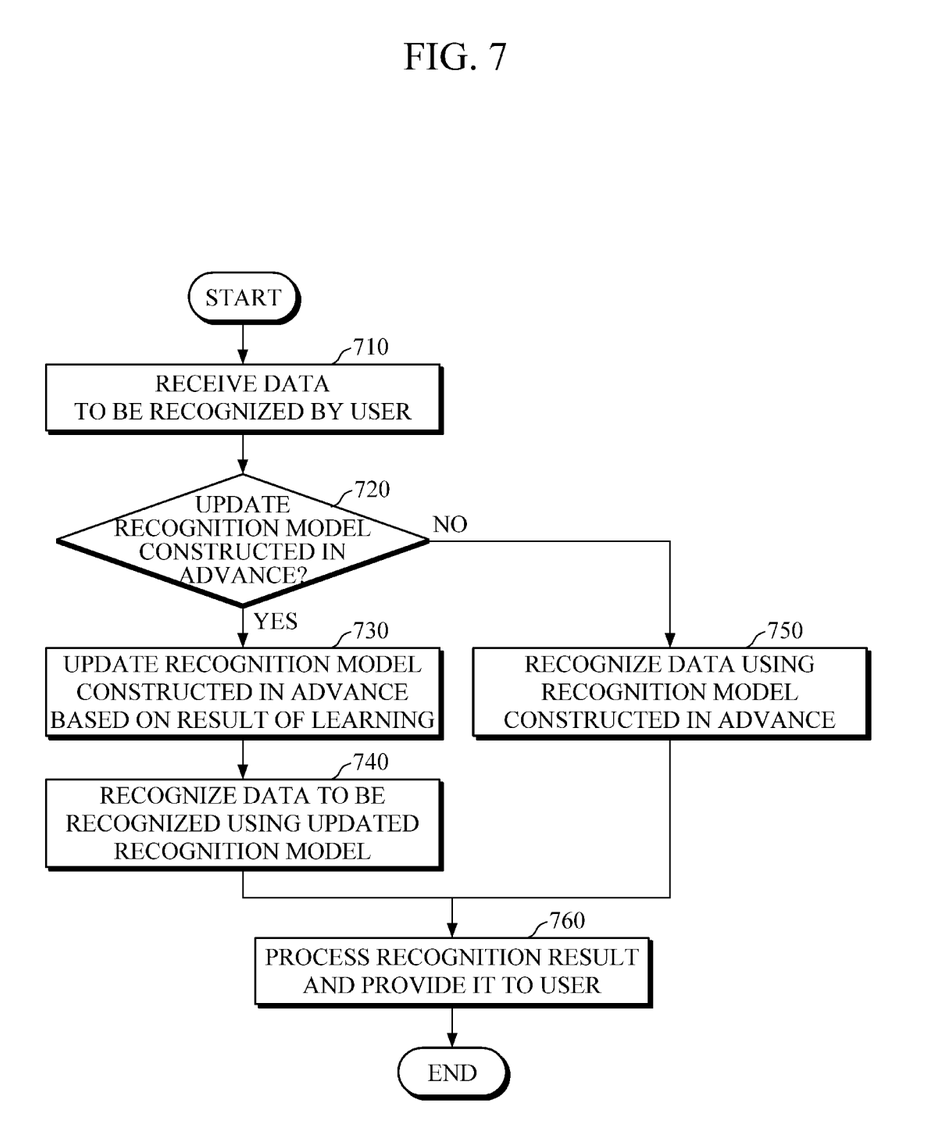
FIG. 7 is a flowchart of an example of a recognition method.

FIG. 7 is a flowchart of a recognition method according to an embodiment.

The flowchart of the recognition method of FIG. 7 is an embodiment performed by the recognition device 600 in FIG. 6. In 710, the recognition device 600 receives additional training data.

Next, in response to data to be recognized being input from the user, in 720, the recognition device 600 may determine whether to use an embedded recognition model as is or to update the recognition model. The recognition device 600 may determine whether to update the recognition model based on at least one of relevance between basic training data used in learning of the recognition model constructed in advance and the data to be recognized and accuracy of a result recognized by the recognition device 600 using the recognition model constructed in advance.

Next, in the event that the recognition device 600 determines that an update of the currently embedded recognition model is required, in 730, the recognition model is updated using various preset methods. In this example, the recognition device 600 may receive additional training data corresponding to a current situation and update the recognition model based on the additional training data. For example, the recognition device 600 may perform a linear summation of a new recognition model generated as a result of training the existing recognition model and the existing recognition model constructed in advance, and may update the existing recognition model based on the result of linear summation.

Next, in 740, the recognition device 600 recognizes the input data using the currently embedded recognition model and output the recognition result.

Otherwise, in the event that the recognition device 600 determines that the currently embedded recognition model may be used as it is, in 750, the recognition device 600 recognizes the input data using the currently embedded recognition model and output the recognition result.

After recognizing the data, in 760, the recognition device 600 processes the recognition result based on the purpose of data recognition and provides the recognition result to the user. For example, the recognition device 600 may provide a text, a voice, a video, or a static image related to the recognition result. According to another example, the recognition device 600 may execute an application based on the recognition result. The recognition device 600 may execute an application based on the recognition result or execute an operation in an application based on the recognition result in the application being executed.

The training data inputter, model learner, model constructor, model evaluator, recognition data inputter, model update determiner, model updater, data recognizer, additional data inputter, recognition result provider, information management unit, model storage and other components, devices and apparatuses illustrated in FIGS. 1, 2, 5 and 6 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3, 4 and 7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A device for constructing a recognition model, the device comprising:
   one or more hardware processors configured to:
     obtain a first recognition model trained based on basic training data;
     obtain new additional training data separate from the basic training data;
     generate a second recognition model by further training the first recognition model to learn the additional training data; and
     construct a final recognition model by integrating the first recognition model with the second recognition model,
   wherein, in the integrating of the first recognition model with the second recognition model, a select weight of the second recognition model is set to emphasize learning of the additional training data over maintaining of the first recognition model, or is set to emphasize the maintaining of the first recognition model over the learning of the additional training data.

2. The device of claim 1, wherein the basic training data and the additional training data comprise at least one of voice data, sound data, image data, text data, and bio-signal data.

3. The device of claim 1, wherein the first recognition model is a neural network-based recognition model.

4. The device of claim 3, wherein, for the generating of the second recognition model, the one or more hardware processors are configured to use either an error back-propagation algorithm or a gradient descent algorithm in training the first recognition model with the additional training data.

5. The device of claim 1, further comprising a memory configured to store one or more first recognition models, including the first recognition model, respectively constructed based on one or more sets of basic training data in advance,
   wherein, for the generating of the second recognition model, the one or more hardware processors are configured to acquire the first recognition model related to the obtained additional training data from the memory.

6. The device of claim 1, wherein, for the constructing of the final recognition model, the one or more hardware processors are configured to obtain a linear sum of the first recognition model and the second recognition model.

7. The device of claim 6, wherein, for the integrating of the first recognition model with the second recognition model, the one or more hardware processors are configured to select one or more weights, including the select weight, from a preset weight candidate group, generate one or more recognition models for each of the selected one or more weights by assigning the selected one or more weights and performing linear summations, and determine at least one of the generated one or more recognition models as a final recognition model.

8. The device of claim 7, wherein the selected one or more weights are preset based on at least one of a comparison between quantity of the basic training data and quantity of the additional training data, a purpose of additional learning, and importance of additional learning.

9. The device of claim 1, wherein the one or more hardware processors are further configured to evaluate a constructed final recognition model using evaluation data in response to the final recognition model being constructed.

10. The device of claim 9, wherein, in response to an evaluation that the final recognition model does not satisfy a predetermined standard, the one or more hardware processors are configured to train the final recognition model to re-learn the additional training data.

11. The device of claim 1, wherein the weight is selected based on a difference between a quantity of the basic training data and a quantity of the additional training data.

12. A method of constructing a recognition model, the method comprising:
   obtaining a first recognition model trained based on basic training data;
   obtaining new additional training data separate from the basic training data;
   generating a second recognition model by further training, using one or more hardware processors, the first recognition model to learn the additional training data; and
   constructing, using the one or more hardware processors, a final recognition model by integrating the first recognition model with the second recognition model,
   wherein, in the integrating of the first recognition model with the second recognition model a select weight of the second recognition model is set to emphasize learning of the additional training data over maintaining of the first recognition model, or is set to emphasize the maintaining of the first recognition model over the learning of the additional training data.

13. The method of claim 12, wherein the first recognition model is a neural network-based recognition model.

14. The method of claim 12, wherein the training of the first recognition model comprises acquiring a first recognition model related to the obtained additional training data from a model storage in response to obtaining the additional training data.

15. The method of claim 12, wherein the constructing of the final recognition model comprises obtaining a linear sum of the first recognition model and the second recognition model.

16. The method of claim 15, wherein the constructing of the final recognition model comprises selecting one or more weights from a preset weight candidate group, generating one or more recognition models for each weight by assigning the selected weights and performing linear summations, and determining at least one of the generated one or more recognition models as a final recognition model.

17. The method of claim 12, further comprising evaluating a constructed final recognition model using evaluation data in response to the final recognition model being constructed.

18. The method of claim 17, further comprising, in response to an evaluation that the final recognition model does not satisfy a predetermined standard, training the final recognition model to re-learn the additional training data.

19. A non-transitory computer-readable storage medium storing instructions that, when executed by a processor, cause the processor to perform the method of claim 12.

20. A recognition device comprising:
one or more hardware processors configured to:
receive data to be recognized from a user;
determine, based on the received data, whether to update a recognition model constructed in advance based on basic training data;
in response to a determination that an update is required, train the recognition model to learn new additional training data separate from the basic training data to update the recognition model, the updating of the recognition model being performed to emphasize learning of the received data over maintaining of the recognition model, or performed to emphasize the maintaining of the recognition model over the learning of the received data; and
recognize the received data using the recognition model constructed in advance or the updated recognition model.

21. The device of claim 20, wherein the one or more hardware processors comprise:
a recognition data inputter configured to obtain the data;
a model update determiner configured to determine whether to update the recognition model constructed in advance;
a model updater configured to train and update the recognition model; and
a data recognizer configured to recognize the received data.

22. The recognition device of claim 20, wherein the model update determiner is configured to determine whether to update the recognition model constructed in advance based on either relevance between basic training data used to construct the recognition model constructed in advance and the received data or accuracy of a recognition result obtained using the recognition model constructed in advance.

23. The recognition device of claim 20, further comprising an additional data inputter configured to receive additional training data related to the received data in response to a determination that an update is required.

24. The recognition device of claim 20, wherein the model updater is configured to perform a weighted linear summation of the recognition model constructed in advance and a recognition model generated as a result of learning of the recognition model constructed in advance and update the recognition model constructed in advance based on the result of the weighted linear summation.

25. The recognition device of claim 20, wherein the one or more hardware processors are configured to process a recognition result based on a determined purpose of the data recognition and provide the processed recognition result to the user.

26. The device of claim 20, wherein a weight of the updated recognition model is selected based on a difference between a quantity of basic training data in the recognition model constructed in advance and a quantity of the additional training data.

27. A recognition model construction device, comprising:
one or more hardware processors configured to:
obtain a first recognition model trained based on basic training data;
obtain a second recognition model by training the first recognition model to learn new additional training data separate from the basic training data; and
construct a third recognition model by integrating the first recognition model with the second recognition model based on a select weight, the select weight being set to emphasize learning of the additional training data over maintaining of the first recognition model, or is set to emphasize the maintaining of the first recognition model over the learning of the additional training data.

28. The device of claim 27, wherein the first recognition model is a model constructed based on basic training data, and the additional training data comprise data not included in the basic training data.

29. The device of claim 27, wherein the one or more hardware processors is configured to construct the third recognition model by using the weight to obtain a linear sum of the first recognition model and the second recognition model.

30. The device of claim 27, wherein the one or more hardware processors is further configured to select a model among recognition models stored in a memory as the first recognition model based on a relevance of the selected model to the additional training data.

* * * * *